No. 789,184. PATENTED MAY 9, 1905.
C. H. STUBBS.
COFFEE CLEANER.
APPLICATION FILED FEB. 4, 1904.
2 SHEETS—SHEET 1.
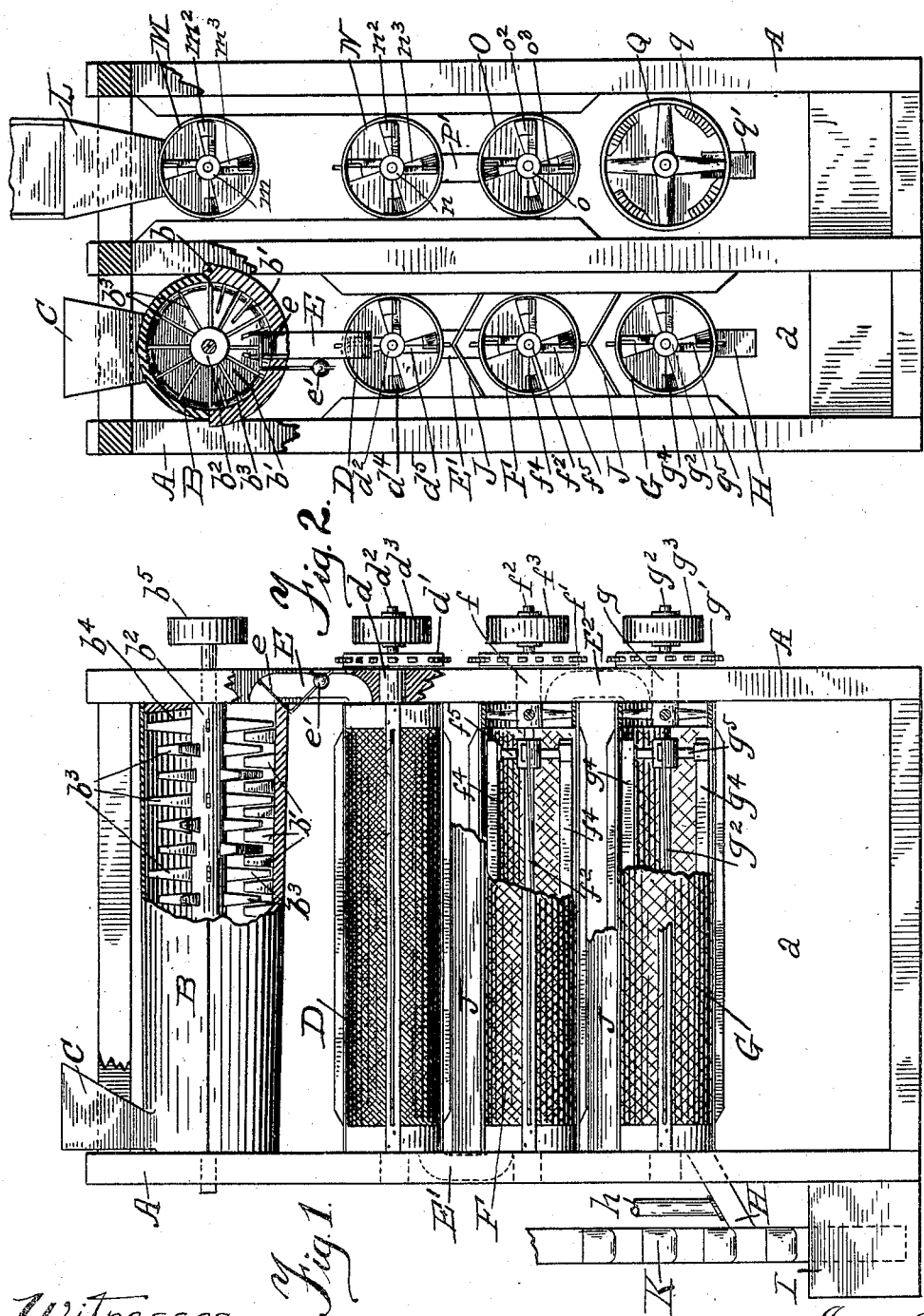

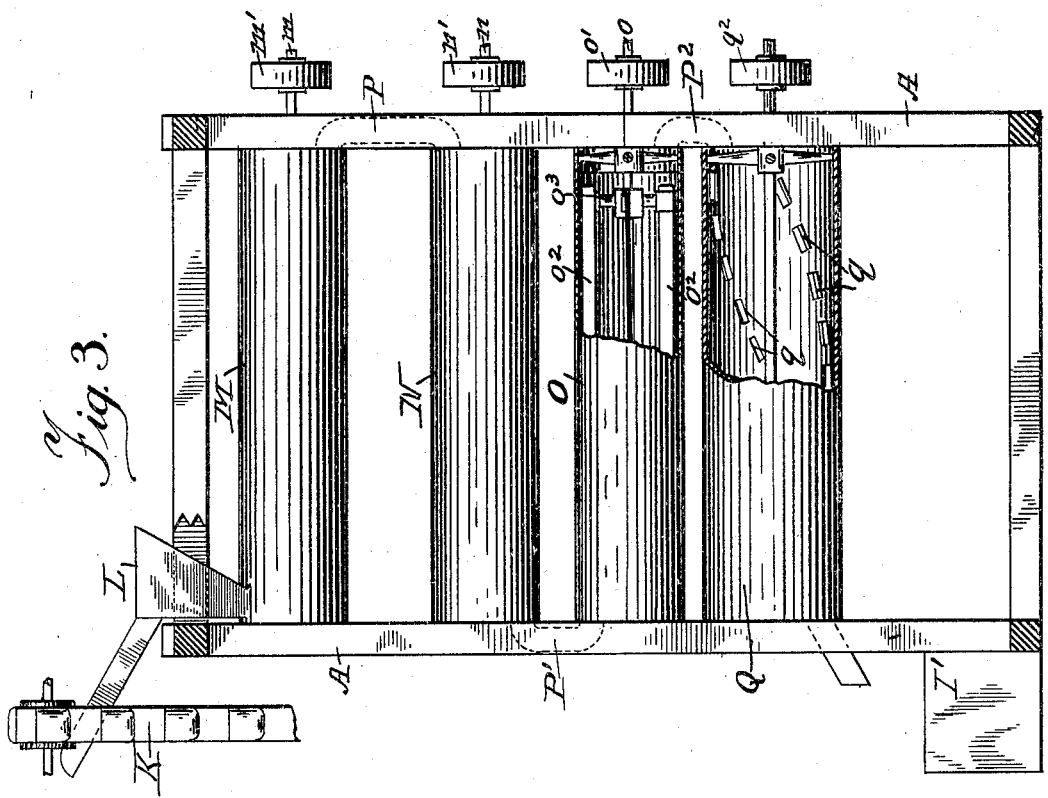

No. 789,184. Patented May 9, 1905.

UNITED STATES PATENT OFFICE.

CHARLES H. STUBBS, OF SAN FRANCISCO, CALIFORNIA.

COFFEE-CLEANER.

SPECIFICATION forming part of Letters Patent No. 789,184, dated May 9, 1905.

Application filed February 4, 1904. Serial No. 191,940.

*To all whom it may concern:*

Be it known that I, CHARLES H. STUBBS, a citizen of the United States, residing in the city and county of San Francisco, State of California, have invented certain new and useful Improvements in Coffee-Cleaners; and I do hereby declare the following to be a full, clear, and exact description of the same.

My invention relates to the general class of cleaning machines or apparatus in which the material is subjected to agitation and resulting friction to remove from its surface any deleterious coating, which after removal is separated from the material, leaving the latter clean.

My invention is particularly applicable to the cleaning of coffee, in which connection, though I do not confine myself thereto, I shall describe it.

Some coffees, notably that which comes from Salvador, Central America, has upon it a coating which to the trade is known as "gold skin" or "red skin." The presence of this skin is disadvantageous in that in a mixture with coffee which is free from it roasting is not uniform, because this skin or coating prevents those berries having it from roasting as quickly as those which are free from it, and therefore if the roasting be continued only long enough to properly finish the latter berries the former will not be roasted enough and if the heat be applied for a time sufficient to properly roast the berries having the skin those free from it will be roasted too much. Thus the roasting is uneven. It therefore becomes important to remove this gold skin, and this it is the object of my invention to attain, with due regard in all respects to the nature of the material operated upon.

My invention consists in the novel construction, arrangement, and combinations of the parts of the machine or apparatus which I shall now describe.

Referring to the accompanying drawings, Figure 1 is a front elevation, partly broken, of my machine. Fig. 2 is an end elevation, the ends being removed to see the interior and the initial cylinder being in cross-section. Fig. 3 is a rear elevation, partly broken. Fig. 4 is a broken section of the final polishing-cylinder. Fig. 5 is a view of one of the directing-blocks $q$ of the polishing-cylinder.

A is the general frame of the machine, which supports the several parts. In the upper portion of one side of this frame is mounted a non-rotatable cylinder B, with which, at or near one end, a feed-hopper C communicates. The cylinder B is impervious and is preferably made in semicylindrical sections, hinged as shown at $b$ in Fig. 2, whereby one section— say the lower—may be dropped to afford access to the interior. The cylinder B is best made with a gradually-increasing diameter from its hopper or receiving end to its discharge end, as seen in Fig. 1, in order to assist by gravity the flow of material through it.

Within the bottom of the cylinder are the fixed teeth $b'$ in several rows and arranged relatively out of line or staggering to present a diagonal pattern like a multiplex thread in direction. Passing through the cylinder is a rotatable shaft $b^2$ to a pulley $b^5$, on which suitable power may be applied. Upon this shaft are secured the teeth $b^3$, disposed spirally in a number of rows around the shaft. These teeth are of shape and length to pass between the fixed teeth $b'$ of the cylinder, and the direction of revolution is such as to feed or advance the material from the hopper end of the cylinder to the discharge end.

In frame A, below the cylinder B, is a cylinder D, the first of the screen series. This cylinder is pervious, its periphery being formed of screen material, the mesh of which, it may be stated at this point, is finer or smaller than that of succeeding screens. The cylinder D is mounted upon end journals $d$ in a manner adapting it to be rotated by suitable connections, for which purpose I have here indicated a sprocket $d'$ upon its journal, to which a chain may be applied. Through the cylinder D extends a shaft $d^2$, adapted to be rotated by suitable means—as, for example, by power applied to a pulley $d^3$ upon it. This shaft within the cylinder carries stirrer-blades $d^4$, Fig. 2, slightly spirally directed and carried by spiders $d^5$. Between the discharge end of the cylinder B and the adjacent end of the screen-cylinder D there is a communication in the shape of a chute or pipe E. Within this chute, as seen in Fig. 1, is seated a gate $e$, automatically controlled by a shiftable weight $e'$ on its handle. By the adjustment of this weight the gate may be caused to yield to more or less pressure, thereby regulating the flow of material through the chute.

Within the cylinder B, near its discharge end and above its communication with the chute E, is a directing or guard plate $b^4$ to guide the material to the chute.

In frame A, below the screen-cylinder D, is a second screen-cylinder F, in all respects like the cylinder D, except that the mesh of its screen is larger or coarser than that of said cylinder D. This second screen-cylinder F is rotatable upon end journals $f$ by power applied through a sprocket $f'$. Through it passes a shaft $f^2$, to be rotated by power applied to a pulley $f^3$, and said shaft carries a stirrer composed of blades $f^4$ and spiders $f^5$.

Between screen cylinders D and F is a communicating chute E', which, it will be seen, is located at the end opposite to chute E.

In frame A, below screen-cylinder F, is a third screen-cylinder G, the mesh of which is still larger or coarser than the mesh of cylinder F. This cylinder G is rotatable upon end journals $g$ by power applied to sprocket $g'$. Upon the shaft $g^2$, which passes through the cylinder and is rotated by power applied to pulley $g^3$, is a stirrer composed of blades $g^4$ and spiders $g^5$.

Between cylinders F and G, at their ends opposite to the chute E', is a chute $E^2$, while at the other end of cylinder G is a spout H, which discharges into a bin I. With this spout H a connection, such as $h$, to a suction-fan (unnecessary to show) may be made.

Between screen-cylinders D and F and between F and G are deflecting-plates J, which direct the screenings laterally to find their way down to the receiving-space $a$ in the frame below the cylinder G.

From the bin I rises an elevator K, Fig. 1, which at its top discharges into a hopper L, Fig. 3, said hopper discharging into the first of the series of cooling-cylinders. This first cylinder (designated by M) is mounted in frame A and is non-rotatable and impervious, being best made of wood. Through it extends a shaft $m$, adapted to be rotated by power applied to a pulley $m'$. Upon this shaft are spirally-directed blades $m^2$, Fig. 2, carried by spiders $m^3$ and adapted to gently stir and advance the material.

Below cylinder M is a second cooling-cylinder N, non-rotary and impervious and having the shaft $n$, with pulley $n'$ and blades $n^2$ and spiders $n^3$, all similar in construction and arrangement to the corresponding parts of cylinder M. In like manner below cylinder N is a third and similar cooling-cylinder O, with its shaft $o$, pulley $o'$, blades $o^2$, and spiders $o^3$.

At the end of cylinder M opposite that at which hopper L is located a chute P, Fig. 3, connects said cylinder with the adjacent end of cylinder N. The cylinder N is at its opposite end connected with the adjacent end of cylinder O by a chute P', and at the opposite end said last-named cylinder is connected by a chute $P^2$ with the final cylinder Q. This last-named cylinder is an impervious one and is mounted rotatably in the frame A and may have suitable means, such as pulley $q^2$, to operate it. This cylinder, which is the final polisher, has upon its interior the spirally-disposed directing-blocks $q$, which advance the material to the discharge end, from which it is delivered through a spout $q'$ into any suitable receptable, such as the bin I'.

The operation of the machine or apparatus is as follows: The coffee, mixed with damp sawdust to slightly dampen it, is fed from hopper C into the receiving end of the cylinder B. In this cylinder, by the action of the teeth $b'$ and $b^3$, the coffee is rubbed to break and remove the larger part of the gold skin and is advanced both by gravity and by the teeth to the discharge end. The function of the sawdust is three-fold: It loosens the skin by dampening the berry, it augments the friction, and it serves as a cushion to prevent crushing injury to the berry. The coffee and sawdust and the rubbed-off skins now pass together through chute E into cylinder D. In this cylinder the material is subjected to considerable agitation and to friction also. In practice to augment these effects the cylinder D is made to rotate in a direction opposite to the direction of rotation of its stirrer-blades $d^4$. The speed of rotation of the cylinder is relatively to that of the stirrer very slow—say, for example, the former being twelve to the minute and the latter four hundred. Two effects are produced in this cylinder. The extreme rotary agitation increases the efficiency of the sifting or screening action of the cylinder, and the friction rubs off more of the skin, portions of which still remain in the folds and creases of the berries. The object of having a small-mesh screen in this cylinder is to prevent a too great sifting discharge of the sawdust, which is still required in greater part as a rubber and as a protecting-cushion against injury due to the great agitation. Much of it, however, together with such parts of the skins as will pass, fall through the screen onto the deflector-plates J and by them are directed downwardly to the refuse-space below. The remaining material advancing through cylinder D falls through chute E' into the next screen-cylinder F, wherein it is subjected to a repetition of the treatment which it underwent in cylinder D. The mesh of this screen F being larger, more of the sawdust and refuse will sift through. The material passing thence into cylinder G is subjected once more to the same or similar operations, and the screen of said cylinder being coarser still almost all of the sawdust and refuse will sift through. What little remains may be sucked out by the fan connection $h$ as the coffee passes through spout H to the bin I. As the coffee advances it gets a little drier and has less tendency to break even though the sawdust is being lessened in quantity. In this series of operations the coffee having been subjected to a rather violent friction is perceptibly warmed, and it is therefore necessary to cool it. From bin I it is taken by the elevator K up to the hopper L, by which it is delivered into the first cooling-cylinder M. In this cylinder, which, being made of wood, is a poor conductor of heat and cold, it is gently agitated by the comparatively slowly rotating blades $m^2$, which polishes it somewhat and advances it to the chute P, by which it is delivered into the second cooling-cylinder N, by which after similar treatment it is delivered to the third cooling-cylinder O. In this it is similarly treated, and being now cooled and pretty thoroughly polished it is delivered into the final rotating polisher Q, in which it is fully polished, and is advanced by the blocks $q$ to the discharge-spout $q'$.

Having thus described my invention, what I claim as new, and desire to secure by Letters Patent, is—

1. A coffee-cleaner comprising an initial rubbing device, a succeeding series of screen-cylinders communicating with said rubbing device and with each other at successively opposite ends, a rotating stirrer in each screen-cylinder, a succeeding series of impervious cooler-cylinders communicating with each other at successively opposite ends, means for conveying the material from the last of the screen-cylinders to the first of the cooler-cylinders, and a final polishing-cylinder communicating with the last of the cooler-cylinders.

2. A coffee-cleaner comprising an initial rubbing device, a succeeding series of screen-cylinders communicating with said rubbing device and with each other at successively opposite ends, a rotating stirrer in each screen-cylinder, a succeeding series of impervious cooler-cylinders communicating with each other at successively opposite ends, rotary stirrers in each cooling-cylinder, means for conveying the material from the last of the screen-cylinders to the first of the cooler-cylinders, and a final rotatable polishing-cylinder communicating with the last of the cooler-cylinders.

3. A coffee-cleaner comprising an initial rubbing device, a succeeding series of rotatable screen-cylinders communicating with said rubbing device and with each other at successively opposite ends, said cylinders having a mesh increasing in coarseness from the first to the last of the series, an independently-rotatable stirrer in each screen-cylinder, a succeeding series of impervious cooler-cylinders communicating with each other at successively opposite ends, rotary stirrers in each cooling-cylinder, means for conveying the material from the last of the screen-cylinders to the first of the cooler-cylinders, and a final rotatable polishing-cylinder communicating with the last of the cooler-cylinders.

4. A coffee-cleaner comprising an initial rubbing device consisting of an impervious cylinder having a series of fixed teeth upon its interior and a rotatable series of teeth meshing with said fixed teeth, a succeeding series of rotatable screen-cylinders communicating with said rubbing device and with each other at successively opposite ends, said cylinders having a mesh increasing in coarseness from the first to the last of the series, an independently-rotatable stirrer in each screen-cylinder, a succeeding series of impervious cooler-cylinders communicating with each other at successively opposite ends, rotary stirrers in each cooling-cylinder, means for conveying the material from the last of the screen-cylinders to the first of the cooler-cylinders, and a final rotatable polishing-cylinder communicating with the last of the cooler-cylinders.

In witness whereof I have hereunto set my hand.

CHARLES H. STUBBS.

Witnesses:
  WALTER F. VANE,
  D. B. RICHARDS.